United States Patent
Calhoun et al.

(10) Patent No.: US 7,346,338 B1
(45) Date of Patent: Mar. 18, 2008

(54) WIRELESS NETWORK SYSTEM INCLUDING INTEGRATED ROGUE ACCESS POINT DETECTION

(75) Inventors: Patrice R. Calhoun, Pleasanton, CA (US); Robert B. O'Hara, Jr., Santa Clara, CA (US); David Anthony Freecone, Terrell, TX (US)

(73) Assignee: Airespace, Inc., San Jose, CA (US)

( * ) Notice: Subject to any disclaimer, the term of this patent is extended or adjusted under 35 U.S.C. 154(b) by 1081 days.

(21) Appl. No.: 10/407,370

(22) Filed: Apr. 4, 2003

(51) Int. Cl.
*H04M 1/66* (2006.01)
(52) U.S. Cl. .................. 455/411; 455/410; 455/423
(58) Field of Classification Search ............... 455/410, 455/423, 456.1
See application file for complete search history.

(56) References Cited

U.S. PATENT DOCUMENTS

| | | |
|---|---|---|
| 5,564,079 A | 10/1996 | Olsson |
| 5,684,860 A | 11/1997 | Milani et al. |
| 6,112,095 A | 8/2000 | Wax et al. |
| 6,115,605 A | 9/2000 | Siccardo et al. |
| 6,134,448 A | 10/2000 | Shoji et al. |
| 6,140,964 A | 10/2000 | Sugiura et al. |
| 6,198,935 B1 | 3/2001 | Saha et al. |
| 6,212,391 B1 | 4/2001 | Saleh et al. |
| 6,249,252 B1 | 6/2001 | Dupray |
| 6,259,406 B1 | 7/2001 | Sugiura et al. |
| 6,269,246 B1 | 7/2001 | Rao et al. |
| 6,275,190 B1 | 8/2001 | Sugiura et al. |
| 6,282,427 B1 | 8/2001 | Larsson et al. |
| 6,304,218 B1 | 10/2001 | Sugiura et al. |
| 6,414,634 B1 | 7/2002 | Tekinay |
| 6,415,155 B1 | 7/2002 | Koshima et al. |
| 6,441,777 B1 | 8/2002 | McDonald |
| 6,456,892 B1 | 9/2002 | Dara-Abrams et al. |
| 6,526,283 B1 | 2/2003 | Jang |
| 6,556,942 B1 | 4/2003 | Smith |
| 6,760,318 B1 | 7/2004 | Bims |
| 6,788,658 B1 | 9/2004 | Bims |
| 6,925,070 B2 | 8/2005 | Proctor, Jr. |
| 6,957,067 B1 | 10/2005 | Iyer et al. |
| 7,002,943 B2 | 2/2006 | Bhagwat et al. |
| 7,016,948 B1 * | 3/2006 | Yildiz .................. 709/221 |

(Continued)

FOREIGN PATENT DOCUMENTS

EP        0 930 514 A2    7/1999

(Continued)

OTHER PUBLICATIONS

Chirumamilla, Mohan K. and Ramamurthy, Byrav. "Agent Based Intrusion Detection and Response System for Wireless LANs." IEEE Int'l Conference on Communications, 2003, vol. 1, pp. 492-496.

(Continued)

*Primary Examiner*—Creighton Smith
(74) *Attorney, Agent, or Firm*—Mark J. Spolyar

(57) ABSTRACT

Methods, apparatuses and systems facilitating automated detection of rogue wireless access points in a wireless network environment. The present invention, in one embodiment, integrates automated detection of rogue access points into wireless network systems. As discussed more fully below, the present invention can be applied to a variety of wireless network system architectures.

19 Claims, 3 Drawing Sheets

U.S. PATENT DOCUMENTS

| | | | |
|---|---|---|---|
| 7,164,663 | B2 | 1/2007 | Frank et al. |
| 7,212,887 | B2 | 5/2007 | Calhoun et al. |
| 2002/0174335 | A1 | 11/2002 | Zhang et al. |
| 2002/0188723 | A1 | 12/2002 | Choi |
| 2003/0023746 | A1 | 1/2003 | Loguinov |
| 2003/0054794 | A1* | 3/2003 | Zhang .................. 455/403 |
| 2003/0117985 | A1 | 6/2003 | Fujii et al. |
| 2003/0135762 | A1 | 7/2003 | Macaulay |
| 2003/0181215 | A1 | 9/2003 | Cromer et al. |
| 2003/0186679 | A1* | 10/2003 | Challener et al. ........ 455/410 |
| 2003/0188006 | A1 | 10/2003 | Bard |
| 2003/0198208 | A1 | 10/2003 | Kocs, Jr. et al. |
| 2003/0219008 | A1 | 11/2003 | Hrastar |
| 2004/0003285 | A1 | 1/2004 | Whelan et al. |
| 2004/0008652 | A1 | 1/2004 | Tanzella et al. |
| 2004/0023639 | A1* | 2/2004 | Noel, Jr. ............... 455/410 |
| 2004/0023640 | A1* | 2/2004 | Ballai ................... 455/411 |
| 2004/0047324 | A1 | 3/2004 | Diener |
| 2004/0049699 | A1 | 3/2004 | Griffith et al. |
| 2004/0076134 | A1 | 4/2004 | Barber et al. |
| 2004/0176108 | A1 | 9/2004 | Misikangas |
| 2004/0198392 | A1* | 10/2004 | Harvey et al. .......... 455/456.1 |
| 2005/0030929 | A1 | 2/2005 | Swier et al. |
| 2005/0073979 | A1 | 4/2005 | Barber et al. |
| 2005/0114649 | A1 | 5/2005 | Challener et al. |
| 2005/0207361 | A1 | 9/2005 | Aljadeff et al. |

FOREIGN PATENT DOCUMENTS

| | | |
|---|---|---|
| EP | 0 967 816 A1 | 12/1999 |
| EP | 1 018 457 A1 | 7/2000 |
| EP | 1 296 531 A1 | 3/2003 |
| EP | 1 301 055 A1 | 4/2003 |
| JP | 02044929 | 2/1990 |
| WO | WO 98/41048 | 12/1999 |
| WO | WO 99/08909 | 7/2000 |
| WO | WO 97/33386 | 10/2000 |
| WO | WO 02/43425 A1 | 5/2002 |
| WO | WO 02/054813 A1 | 7/2002 |
| WO | WO 03/023443 A2 | 3/2003 |

OTHER PUBLICATIONS

"IBM Research Demonstrates Industry's First Auditing Tool for Wireless Network Security." Jul. 12, 2001, Hawthorne, N.Y. IBM Research News, 'Online. URL: http://domino.research.ibm.com/comm/pr.nsf/pages/news.20010712_wireless.html.

"IBM Researchers Demonstrate Industry's First Self-Diagnostic Wireless Security Monitoring Tool." Jun. 21, 2002, Hawthorne, N.Y. IBM NIEUWS, 'Online! URL: http://domino.research.ibm.com/comm/pr.nsf/pages/news.20020617_dwsa.html.

"Ekahau Logical Areas-location enabling the Wi-Fi network." Apr. 4, 2003. Ekahau, Inc., Saratoga, CA. Company's URL: www.ekahau.com.

"Ekahau Positioning Engine 2.0: Product Overview." Apr. 4, 2003. Ekahau, Inc., Saratoga, CA. URL: http://www.ekahau.com/products/positioningengine/.

"Ekahau Positioning Engine 2.0: Data Sheet." Apr. 4, 2003. Ekahau, Inc., Saratoga, CA. URL: http://www.ekahau.com/pdf/EPE_2.0_datasheet.PDF.

"Indoor Positioning in 802.11b Networks." Apr. 4, 2003. Ekahau, Inc., Saratoga, CA. URL: http://www.ekahau.com/products/positioningengine/features.html.

"InFielder." Apr. 22, 2003. Wireless Valley, Austin, TX. URL: http://www.wirelessvalley.com/Products/InFielder/InFielder.asp.

"LANFielder." Apr. 22, 2003. Wireless Valley, Austin, TX. URL: http://www.wirelessvalley.com/Products/LANFielder/LANFielder.asp.

"Optimatic." Apr. 22, 2003. Wireless Valley, Austin, TX. URL: http://www.wirelessvalley.com/Products/Optimatic/Optimatic.asp.

"Predictor." Apr. 22, 2003. Wireless Valley, Austin, TX. URL: http://www.wirelessvalley.com/Products/Predictor/Predictor.asp.

"LANFielder Product Literature." Feb. 10, 2004. Wireless Valley, Austin, TX. URL: http://www.wirelessvalley.com/Assets/brochures/LanFielder.pdf.

Conley, C.. "Securing WLANS with Location-Enabled Networks." Wireless Security Perspectives, vol. 5,No. 3.Mar. 2003. Organization's URL: www.cnp-wireless.com/wsp.html.

"Company Information." Apr. 6, 2004. Corsair Communications:A LightBridge Company, Burlington, MA. Company's URL: www.lightbridge.com.

"Corporate Fact Sheet." Aruba Wireless Networks, San Jose, CA. Feb. 10, 2004. URL: http://www.arubanetworks.com/pdf/corporate_fact_sheet.pdf.

"Airwave Rogue Access Point Detection." 2002. Airwave Wireless, Inc. San Mateo, CA. URL: http://airwave.com/features.html.

Geier, J. "Identifying Rogue Access Points." Jan. 6, 2003. Wi-Fi Planet Tutorials. URL: http://www.wi-fiplanet.com/tutorials/article.php/1564431.

Brewin, B. "IBM Develops Tool to Detect Rogue Wireless LAN Access Points." Jun. 17, 2002. Computerworld, Framingham, MA. URL: http://www.computerworld.com/mobiletopics/mobile/story/0,10801,72065,00.html.

Bulusu, N., Heidemann, J., Estrin, D. "GPS-less Low Cost Outdoor Localization for Very Small Devices." *IEEE Personal Communications*, Oct. 2000. URL: http://lecs.cs.ucla.edu/~bulusu/papers/Bulusu00a.pdf.

"Assessing Wireless Security with AiroPeek and AiroPeek NX." A WildPackets Academy Tutorial from www.wildpackets.com, WildPackets Inc., Walnut Creek, CA. Jan. 16, 2003. URL: http://www.wildpackets.com/elements/whitepapers/AiroPeek_Security.pdf.

"AiroPeek and Wireless Security: Identifying and Locating Rogue Access Points." A WildPackets Academy Tutorial from www.wildpackets.com, WildPackets Inc., Walnut Creek, CA. Jan. 16, 2003. URL: http://www.wildpackets.com/elements/whitepapers/RogueAccessPoints.pdf.

Craiger, J. P. "802.11, 802.1x, and Wireless Security." Jun. 23, 2002. From the SANS' Information Security Reading Room on www.sans.org, The SANS Institute, Bethesda, MD. URL: http://www.sans.org/rr/papers/68/171.pdf.

Baily, S. "Is IEEE 802.1x Ready for General Deployment?" Apr. 7, 2002. From the SANS' Information Security Reading Room on www.sans.org, The SANS Institute, Bethesda, MD. URL: http://www.sans.org/rr/papers/9/709.pdf.

International Standard, ISO/IEC 8802-11 ANSI/IEEE Std. 802.11, 1999 Edition, Part II: Wirelss LAN Medium Access Control (MAC) and Physical Layer (PHY) specifications; pp. 122-137.

"Icp-masq" Internet citation http://speed.cis.nctu.edu.tw/bandwith/opensource/, Daa Sheet Cisco Aironet 1200 Series Access Point, pp. 1-13, posted Mar. 11, 2002.

\* cited by examiner

Fig._1

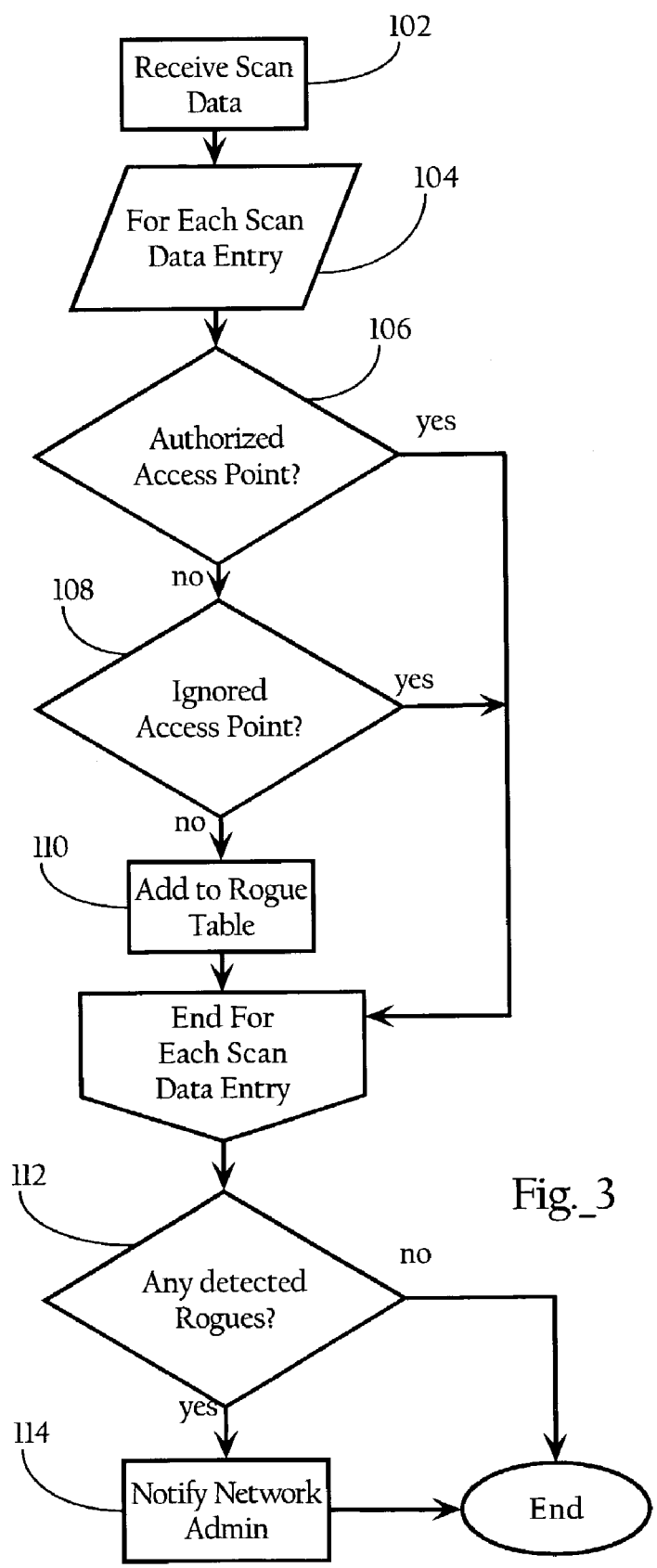
Fig._3

WIRELESS NETWORK SYSTEM INCLUDING INTEGRATED ROGUE ACCESS POINT DETECTION

CROSS-REFERENCE TO RELATED APPLICATIONS

This application makes reference to the following commonly owned U.S. patent applications and/or patents, which are incorporated herein by reference in their entirety for all purposes:

U.S. patent application Ser. No. 10/155,938 in the name of Patrice R. Calhoun, Robert B. O'Hara, Jr. and Robert J. Friday, entitled "Method and System for Hierarchical Processing of Protocol Information in a Wireless LAN."

FIELD OF THE INVENTION

The present invention relates to wireless computer networks and, more particularly, to methods, apparatuses and systems facilitating automated detection of rogue access points in a wireless network environment.

BACKGROUND OF THE INVENTION

Market adoption of wireless LAN (WLAN) technology has exploded, as users from a wide range of backgrounds and vertical industries have brought this technology into their homes, offices, and increasingly into the public air space. This inflection point has highlighted not only the limitations of earlier-generation systems, but the changing role WLAN technology now plays in people's work and lifestyles, across the globe. Indeed, WLANs are rapidly changing from convenience networks to business-critical networks. Increasingly users are depending on WLANs to improve the timeliness and productivity of their communications and applications, and in doing so, require greater visibility, security, management, and performance from their network.

As enterprises and other entities increasingly rely on wireless networks, monitoring and management of the components implementing the wireless network environments becomes critical to performance and security. Indeed, wireless networks pose security risks not generally encountered in wired computer networks. For example, employees or malicious users may connect an unauthorized ("rogue") wireless access point to the corporate network, exposing the network to any wireless client in the coverage area of the access point, and possibly affecting the performance of the enterprises own wireless network infrastructure.

To detect rogue access points affecting a wireless network deployment, prior art processes, such as site surveys and periodic inspections, typically involve a human tester roaming throughout the wireless network environment with specialized equipment, such as a WLAN tester, that sweeps the wireless coverage area and stores the resulting data for analysis of one or more attributes of the wireless network deployment, such as the presence and identity of access points. Such site surveys and inspections, however, are time consuming and expensive. In addition, the analysis of the wireless network environment is performed with data gathered at a single point in time and, therefore, is not responsive to periodic or subsequent changes associated with the wireless network environment (such as installation of new rogue access points, etc.).

In addition, rogue access points may also affect the performance of a wireless network. In an Ethernet LAN (IEEE 802.3), the Carrier Sense Multiple Access with Collision Detection (CSMA/CD) protocol establishes how simultaneous transmissions (packet collisions) are handled. In a WLAN, collision detection in this manner is not possible due to what is known as the "near/far" problem: to detect a collision, a station must be able to transmit and listen at the same time. To account for this difference, the 802.11 protocol uses a slightly different protocol known as Carrier Sense Multiple Access with Collision Avoidance (CSMA/CA) or the Distributed Coordination Function (DCF). CSMA/CA attempts to avoid packet collisions by using explicit packet acknowledgement (ACK), which means that an ACK packet is sent by the receiving station to confirm that a packet arrived intact. CSMA/CA works by having the transmitting wireless station sense the air for wireless traffic. If there is no activity detected, the transmitting wireless station will wait an additional random period of time. If there still is no activity, the wireless station transmits the data. If the packet is received intact, the receiving station will send and ACK frame that, once received by the original sender, completes the transmission. If the ACK command is not received in a predetermined period of time, the data packet will be resent under the assumption that the original packet experienced a collision. CSMA/CA also handles other interference and radio-wave related problems effectively, but creates considerable overhead. Accordingly, the presence of rogue access points operating on overlapping channels within the vicinity of an authorized access affects the performance of the enterprise's wireless network.

Given the collision avoidance mechanisms employed in 802.11-compliant wireless networks, management and monitoring of the wireless network airspace (for example, to ensure that wireless access points do not interfere with one another) are critical to the performance of the wireless network environment. The administrative or management functionality associated with WLAN networks, however, generally lacks an integrated and/or automated means of detecting rogue access points. Hand-held scanners, AP startup scans, or full-time scanning devices are the current methods of obtaining data characterizing the network devices within a wireless network environment. Accordingly, many WLANs do not perform at optimum speed due to overlapping channel interference and rogue access points (i.e., access points installed without authorization and/or knowledge of a network administrator).

In light of the foregoing, a need in the art exists for methods, apparatuses and systems that facilitate detection of rogue access points in wireless network environments. Embodiments of the present invention substantially fulfill this need.

SUMMARY OF THE INVENTION

The present invention provides methods, apparatuses and systems facilitating automated detection of rogue wireless access points in a wireless network environment. The present invention, in one embodiment, integrates automated detection of rogue access points into wireless network systems. As discussed more fully below, the present invention can be applied to a variety of wireless network system architectures.

DESCRIPTION OF THE DRAWINGS

FIG. 3 is a flow chart diagram providing a method directed to the processing of scan data to identify rogue access points.

DESCRIPTION OF PREFERRED EMBODIMENTS

Figure 1:
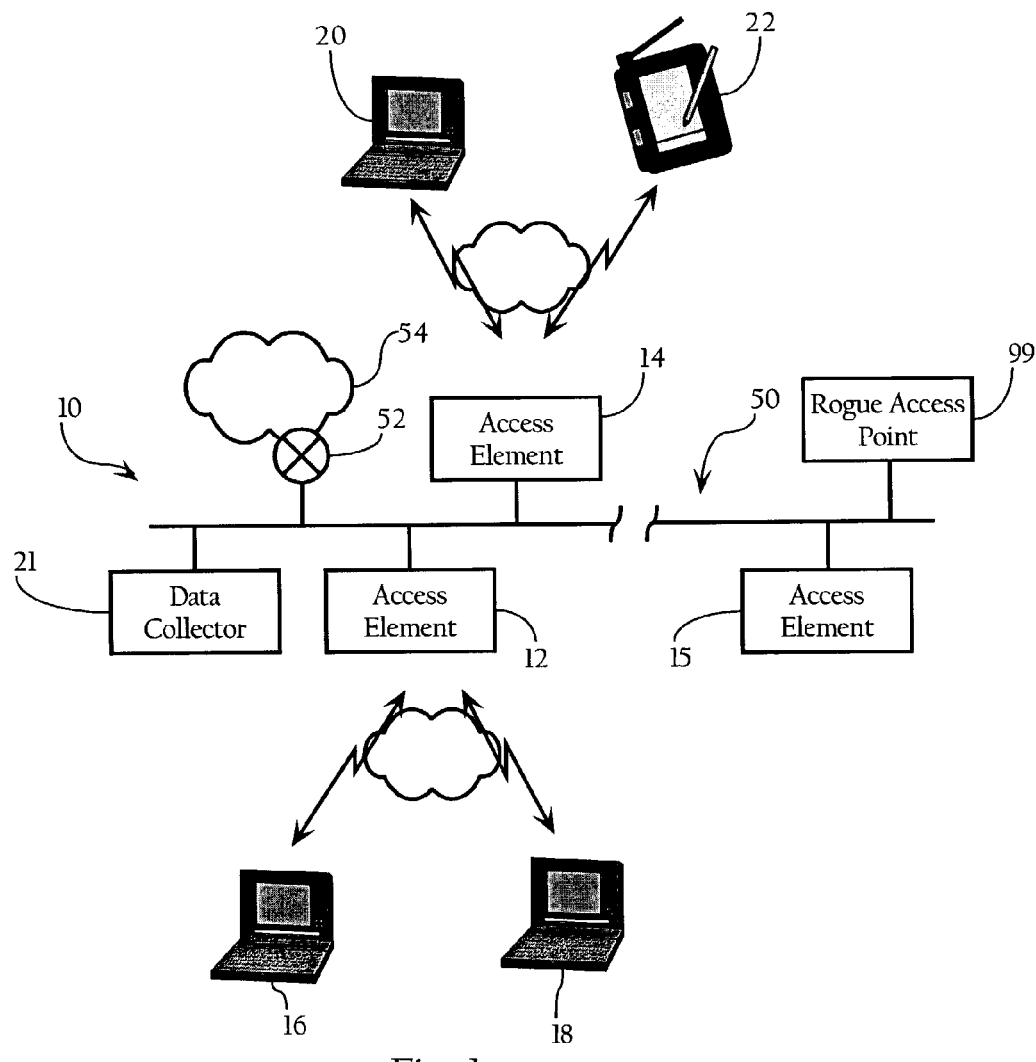
FIG. 1 is a functional block diagram illustrating a computer network environment including a wireless network system according to an embodiment of the present invention.

FIG. 1 illustrates a computer network environment including rogue access point detection functionality according to an embodiment of the present invention. The computer network environment depicted in FIG. 1 includes access elements 12, 14, 15 operably connected to wide area network 50 comprising a plurality of local area network segments 10. In one embodiment, the present invention further includes data collector 21 to receive scan data from access elements 12, 14, 15 and process the scan data to identify rogue access points, such as rogue access point 99, as described below. A rogue access point 99 is a wireless access point unknown and/or unauthorized to the enterprise associated with the network environment. A rogue access point may be operably connected to the enterprise's WAN 50 (as shown in FIG. 1) and/or operating within the coverage area or operating range of at least one of the access elements 12, 14, 15. As discussed more fully below, the frames or packets transmitted and/or received by rogue access point 99 reveal information which can be used to identify the access point and determine whether it is unauthorized or known.

The access elements, such as access elements 12, 14, are operative to establish wireless connections with remote client elements, such as remote client elements 16, 18, 20 and 22. The access elements can operate to bridge wireless traffic between the remote client elements and a wired computer network such as wide area network (WAN) 50, and/or act as hubs to route data between remote client elements within their respective coverage areas. The access elements, in one embodiment, are operative to dynamically recognize new users/remote client elements and wirelessly communicate with one to a plurality of remote client elements. The access elements, in one embodiment, each include a radio frequency transmitter/receiver unit or an infrared transmitter receiver unit, or both. However, any suitable means of wireless communication can be used. The access elements can operate in connection with any suitable wireless communications protocol, including 802.11a and 802.11b. The access elements feature a scanning mode, according to which the access elements monitor their respective coverage areas for wireless traffic relative to at least one frequency channel and gather scan data characterizing detected wireless traffic. The scan data can be transmitted to a central management device, such as data collector 21 (FIG. 1) or central control element 24 (FIG. 2) for processing and detection of rogue access points. In one embodiment, the access elements operate in a normal access point mode bridging wireless traffic between WAN 50 and the remote client elements. However, at a regular scanning interval, the access element switches to a scanning mode according to which it monitors its coverage area for wireless traffic for a scanning period. The scanning interval and/or the scanning period can be configurable parameters allowing network administrators to specify the scanning behavior of each access element individually or as a group. For example, a typical scanning period may span 50-60 milliseconds, while a typical interval between scans (scanning interval) may be five to ten seconds. In one embodiment, the access elements can either just disappear (from the perspective of the remote client elements) for the scan period, or use the mechanisms in 802.11 for "contention-free periods" to halt the transmissions of the mobile stations before going off channel to perform the scan.

In one embodiment, the access elements each include a scanning daemon that, when invoked at each scanning interval, switches operation of the access element to scan mode. For a scanning duration, the scanning daemon monitors for the coverage area for wireless traffic on a given frequency channel and records scan data characterizing any packets detected on the channel. The scanning daemon monitors wireless traffic on a given channel and then switches to another channel. The scanning daemon can operate in a variety of manners during the scanning period. For example, the scanning daemon can monitor for wireless traffic on a single frequency channel for the entire scanning period and switch to another or next frequency channel in a subsequent scanning period. Alternatively, the scanning daemon can scan a plurality of frequency channels during a given scan period. In addition, the scanning daemon can be configured to transmit the scan data directly to a central repository, such as data collector 21, or store it locally for later transmission in response to a request from the data collector 21.

During the scan, the scanning daemon monitors for packets on a given channel, parsing the packets and recording information about the packets in a data structure, such as a table. 802.11 wireless network environments feature a number of different frame or packet types and sub-types, such as management frames (e.g., association requests and responses), control frames (e.g., request-to-send frames, and acknowledgments), and data frames. Every 802.11 frame includes a control field that allows for resolution of frame type. In addition, 802.11 frames also include the MAC address of the source and destination station. Certain 802.11 frames also include the Service Set Identifier (SSID) associated with the access point or element, such as beacon frames, probe responses and association requests. In one embodiment, the scanning daemon can be configured to record data only for particular frame types or sub-types. For example, the scanning daemon can be configured to record data for detected beacon frames, probe responses and association requests, since these frames yield both MAC address and SSID information for a given access point. Of course, other wireless protocols may require a different configuration. Therefore, the scan data fields can include MAC addresses, SSID, frequency channel and any other information available from 802.11 frame headers, or in any protocol where there is a specification of the fields of the frames. In one embodiment, the scanning daemon can record information on all packets detected during a scan, or summarize the information to eliminate redundant information.

Data collector 21, in one embodiment, is a network device that receives scan data from the access elements and processes the scan data to identify potential rogue access points. In one embodiment, the functionality of data collector 21 can be incorporated into a wireless network management platform or appliance. In one embodiment, data collector 21 filters the scan data against information relating to known access elements to identify rogue access points. In one embodiment, data collector 21 includes an access point table storing information relating to known access elements. In one embodiment, the access point table includes an access element identifier field and a service set identifier field. In 802.11 wireless network environments, the access element identifier is the MAC address corresponding to a given access element, while the service set identifier is the SSID contained in certain management frames, such as beacon frames, probe response frames, and association request frames. The access point table can be manually configured by a network administrator with knowledge of the MAC address and the SSID of the access elements.

FIG. 3 provides a method directed to the processing of scan data collected by the access elements. In operation, the data collector 21, in one embodiment, receives scan data from the access elements (102) as each access element periodically switches to scan mode, monitors for wireless traffic, and transmits scan data. Data collector 21, for each entry in the scan data (104), filters the scan data by MAC address and/or SSID against the access point table to identify rogue access points (106). If a scan data entry associated with a detected access point does not match an entry in the access point table, data collector 21, in one embodiment, filters the scan data entry against an ignored access point table (108).

The ignored access point table is a data structure storing information relating to access points that have been previously detected, reported to a network administrator, and placed in the ignored access point table. Typically, an ignored access point is an access point associated with a neighboring enterprise or entity, and not connected to the enterprises network. Nevertheless, since its coverage area overlaps the coverage area of one or more access elements, it is detected during rogue access point scans. The network administrator may investigate the status of the detected access point, determine that it is associated with a neighboring business using it for legitimate purposes, and therefore choose to ignore it.

Otherwise, if the scan data entry does not match an entry in either the access point table of the ignored access point table, data collector 21 adds the scan data entry to a rogue table (110). In one embodiment, the rogue table includes the following fields: 1) MAC address of the detected access point, 2) SSID, 3) frequency channel (on which access point was detected or included in management frames), and 4) an identifier for the access element(s) that detected the rogue access point. As FIG. 3 illustrates, data collector notifies a network administrator if any rogue access points were identified in the scan data (112, 114). Data collector 21 can be configured to notify the network administrator in a variety of ways, such as email notifications, SMS or other text messaging notifications, and the like. The network administrator accessing the data collector 21 via a browser on a network computer for example can view the rogue table. The network administrator may then take appropriate actions, such as determining the location of the access point, disabling the access point, or adding the access point to the ignored access point table.

Figure 2:
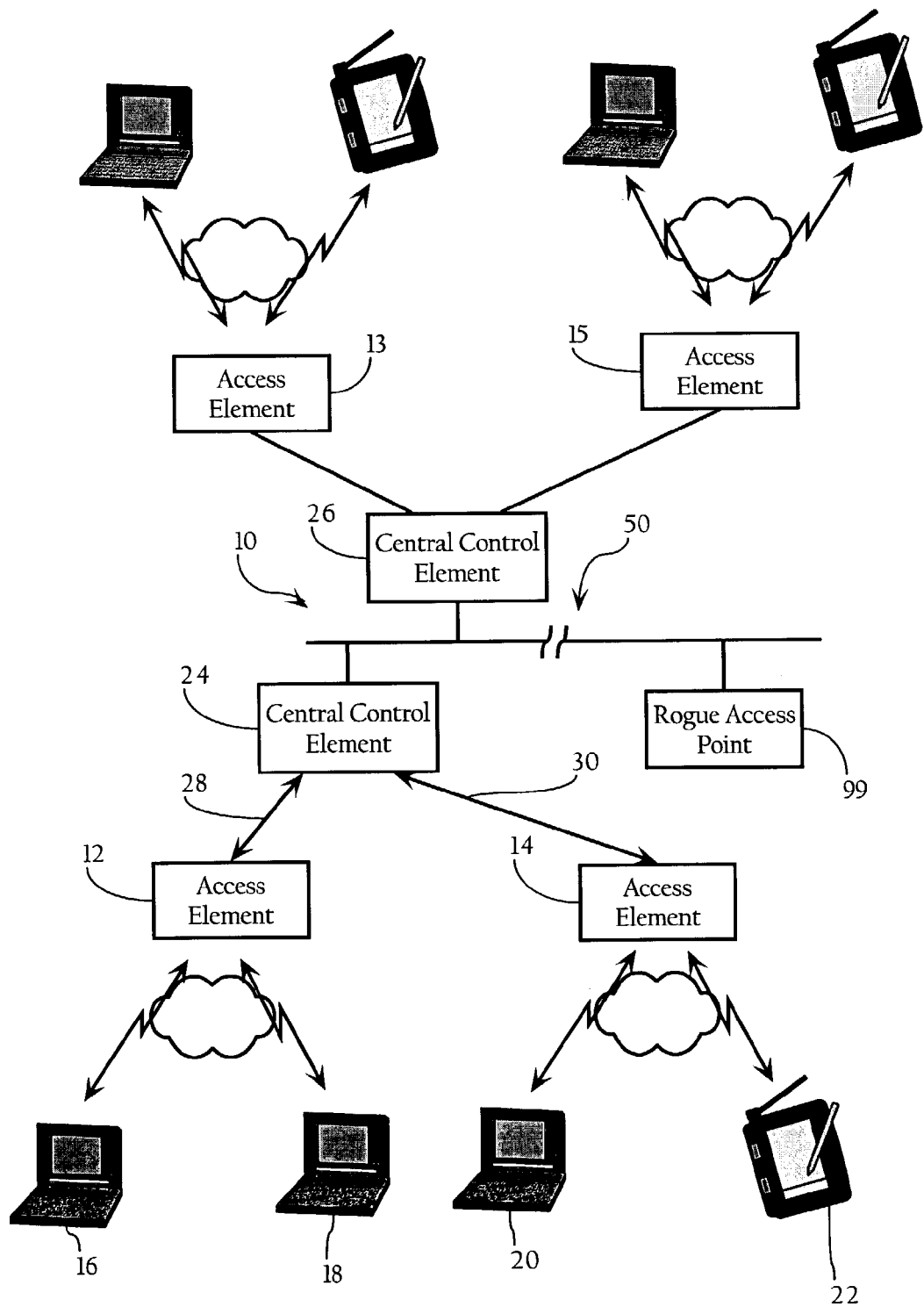
FIG. 2 is a functional block diagram illustrating a wireless network system according to a second embodiment of the present invention.

Other system architectures are possible. For example, the rogue detection functionality according to the present invention can be implemented within the context of a hierarchical wireless network infrastructure. U.S. application Ser. No. 10/155,938 discloses a wireless network system having a hierarchical architecture for the management of multiple access elements by a central control element. FIG. 2 illustrates a hierarchical wireless networking system according to an embodiment of the present invention, including the following components: access elements 12-15 for wireless communication with selected remote client elements 16, 18, 20, 22, central control elements 24, 26, and means for communication between the access elements and the central control elements, typically direct line access 28, 30, but potentially a wireless backbone, fiber or other reliable link.

In another embodiment, access elements 12, 14 are directly connected to LAN 10 or a virtual local area network (VLAN) for communication with central control element 24.

The access elements 12-15 are coupled via communication means using a wireless local area network (WLAN) protocol (e.g., IEEE 802.11a or 802.11b, etc.) to the client remote elements 16, 18, 20, 22. The communications means 28, 30 between the access elements 12, 14 and the central control element 24 is typically an Ethernet network, but it could be anything else which is appropriate to the environment. As described in U.S. application Ser. No. 10/155,938, the access elements 12, 14 and the central control element 24 tunnel network traffic associated with corresponding remote client elements 16, 18; 20, 22 via direct access lines 28 and 30, respectively. Central control element 24 is also operative to bridge the network traffic between the remote client elements 16, 18; 20, 22 transmitted through the tunnel with corresponding access elements 12, 14.

As described in the above-identified patent application, central control element 24 operates to perform link layer management functions, such as authentication and association on behalf of access elements 12, 14. For example, the central control element 24 provides processing to dynamically configure a wireless Local Area Network of a system according to the invention while the access elements 12, 14 provide the acknowledgment of communications with the client remote elements 16, 18, 20, 22. The central control element 24 may for example process the wireless LAN network management messages, load control, channel control, and handoff. Among the network management messages are authentication requests of the client wireless access elements 12, 14 and association requests of the client wireless access elements 12, 14. The network management messages are passed on from the client remote elements 16, 18; 20, 22 via the access elements 12, 14, such as authentication requests and authorization requests, whereas the access elements 12, 14 provide immediate acknowledgment of the communication of those messages without conventional processing thereof. Similarly, the central control element 24 may for example process physical layer information. Still further, the central control element 24 may for example process information collected at the access elements 12, 14 on channel characteristic, propagation, and interference or noise. Central control element 26 and associated access elements 13, 15 operate in a similar or identical manner.

According to one embodiment, the central control elements 24, 26 may incorporate the functionality of data collector 21 (see above) to receive scan data and process it to identify rogue access points. Access elements 12-15 are configured, as discussed above, to switch to a scan mode for a scanning period at regular scanning intervals, and transmit scan data to the central control elements with which they are each associated. In one embodiment, the central control elements 24, 26 are configured to automatically discover the access elements to which they are connected by various layer 2 and 3 discovery mechanisms, and populate the access point table. In addition, central control elements 24, 26 can also be configured to automatically discover each other over LAN 10 or WAN 50 using layer 2 and/or layer 3 discovery mechanisms as well. The central control elements 24, 26 can also be manually configured with knowledge of each other. Since access elements 13, 15 may be detected during a scan by either access elements 12 or 14, the central control elements exchange access point table information. In the example of FIG. 2, central control element 24 would provide to central control element 26 the MAC addresses and SSIDs associated with access elements 12, 14. Similarly, central control element 26 would provide to central control element 24 the MAC addresses and SSIDs associated with access elements 13, 15. Each central control element 24, 26 adds the information to the access point tables to allow for proper identification of authorized or rogue access elements. Information in ignored access point tables can be exchanged in similar manners as well to allow for configuration changes made at one central control element to be distributed to the others. Such exchanges of information can be performed at periodic intervals or in response to updates to the access point and/or ignored access point tables.

The invention has been explained with reference to specific embodiments. Other embodiments will be evident to those of ordinary skill in the art. For example, although embodiments of the present invention have been described as operating in 802.11 wireless networks, the present invention can be applied other wireless network environments implementing alternative networking protocols. It is, therefore, intended that the claims set forth below not be limited to the embodiments described above.

What is claimed is:

1. A system facilitating automatic detection of rogue access points, comprising
    a data collector,
    at least one access element for wireless communication with at least one remote client element and for communication with the data collector,
    wherein the at least one access element is operative to:
        establish and maintain, in an access point mode, wireless connections with remote client elements;
        switch to a scanning mode for a scanning period at a scanning interval to detect wireless traffic,
        record scan data characterizing the detected wireless traffic, and
        transmit the scan data to the data collector;
    wherein the data collector is operative to
        process the scan data against an access point table including information relating to authorized access points, and against an ignored access point table storing information relating to unauthorized access points that have been previously detected and placed in the ignored access point table, to identify rogue access elements.

2. The system of claim 1 wherein the scanning period is a configurable parameter.

3. The system of claim 1 wherein the scanning interval is a configurable parameter.

4. The system of claim 1 wherein the access element is operative to scan for wireless traffic on a plurality of frequency channels.

5. The system of claim 1 wherein the wireless traffic comprises a plurality of packets; and wherein a scanning daemon is operative to parse the information in the packets, and transmit the packet information to the data collector.

6. The system of claim 1 wherein the access elements are operative to bridge wireless traffic between the remote client elements and a computer network.

7. The system of claim 1 further comprising a second data collector associated with a second plurality of access elements, wherein the first and second data collectors are operative to exchange data relating to access elements.

8. The apparatus of claim 1 wherein the scan data comprises at least one scan data entry corresponding to a detected access point.

9. The apparatus of claim 8 wherein the scan data entry comprises a MAC address and a service set identifier.

10. An apparatus facilitating the automatic detection of rogue access points, comprising
    a transmit/receive unit for wireless communication with at least one remote client element,
    a network interface for communication with a data collector over a computer network,
    wherein the apparatus is operative to:
        establish and maintain, in an access point mode, wireless connections with remote client elements to bridge wireless traffic between the remote client elements and a computer network;
        switch from the access point mode to a scanning mode for a scanning period at a scanning interval to detect wireless traffic on at least one frequency channel,
        announce a contention-free period prior to switching from the access point mode to the scanning mode;
        record scan data characterizing the detected wireless traffic, and
        transmit the scan data to a data collector.

11. The apparatus of claim 10 wherein the scanning period is a configurable parameter.

12. The apparatus of claim 10 wherein the scanning interval is a configurable parameter.

13. The apparatus of claim 10 wherein the apparatus is operative to scan for wireless traffic on a plurality of frequency channels.

14. The apparatus of claim 10 wherein the wireless traffic comprises a plurality of packets; and wherein the apparatus is operative to parse the information in the packets, and transmit the packet information to the data collector.

15. The apparatus of claim 10 wherein the apparatus is operative to bridge wireless traffic between the remote client elements and the computer network.

16. The apparatus of claim 10 further comprising a scanning daemon operative to switch the apparatus from the access point mode to the scanning mode.

17. The apparatus of claim 10 wherein the scan data comprises at least one scan data entry corresponding to a detected access point.

18. The apparatus of claim 17 wherein the scan data entry comprises a MAC address and a service set identifier.

19. A system facilitating automatic detection of rogue access points, comprising
    a plurality of access elements for wireless communication with at least one remote client element and for communication with a central control element;
    a central control element for supervising said access elements, wherein the central control element is operative to manage wireless connections between the access elements and corresponding remote client elements,
    wherein the access elements are each operative to
        establish and maintain, in an access point mode, wireless connections with remote client elements;
        switch to a scanning mode for a scanning period at a scanning interval to detect wireless traffic,
        record scan data characterizing the detected wireless traffic, and
        transmit the scan data to the central control element;
    wherein the central control element is operative to process the scan data against information relating to known access elements to identify rogue access points;
    a second plurality of access elements for wireless communication with at least one remote client element and for communication with a central control element; and
    a second central control element for supervising said second plurality of access elements, wherein the second central control element is operative to manage wireless connections between the access elements and corresponding remote client elements, wherein the second access elements are each operative to
establish and maintain, in an access point mode, wireless connections with remote client elements;
switch to a scanning mode for a scanning period at a scanning interval to detect wireless traffic,
record scan data characterizing the detected wireless traffic, and
transmit the scan data to the second central control element;

wherein the second central control element is operative to process the scan data against information relating to known access elements to identify rogue access elements; and wherein the first and second central control elements are operative to exchange information relating to known access elements.

* * * * *

UNITED STATES PATENT AND TRADEMARK OFFICE
CERTIFICATE OF CORRECTION

PATENT NO.       : 7,346,338 B1
APPLICATION NO.  : 10/407370
DATED            : March 18, 2008
INVENTOR(S)      : Calhoun et al.

It is certified that error appears in the above-identified patent and that said Letters Patent is hereby corrected as shown below:

Title page
(75) Inventor name should be changed from "David Anthony Freecone" to --David Anthony Frascone.--

Signed and Sealed this

First Day of July, 2008

JON W. DUDAS
*Director of the United States Patent and Trademark Office*